(12) United States Patent
Krzyzanowski (10) Patent No.: US 7,769,910 B2
(45) Date of Patent: Aug. 3, 2010

(54) SYSTEMS AND METHODS FOR ACTIVITY-BASED CONTROL OF CONSUMER ELECTRONICS

(75) Inventor: Paul Krzyzanowski, Flemington, NJ (US)

(73) Assignee: OpenPeak Inc, Boca Raton, FL (US)

( * ) Notice: Subject to any disclaimer, the term of this patent is extended or adjusted under 35 U.S.C. 154(b) by 507 days.

(21) Appl. No.: 11/812,238

(22) Filed: Jun. 15, 2007

(65) Prior Publication Data

US 2008/0313548 A1    Dec. 18, 2008

(51) Int. Cl.
*G06F 3/00* (2006.01)
*G06F 13/12* (2006.01)

(52) U.S. Cl. ............... 710/5; 710/62; 710/72; 715/718

(58) Field of Classification Search ............ 710/1, 710/5–7, 62, 72–74; 715/715–718
See application file for complete search history.

(56) References Cited

U.S. PATENT DOCUMENTS

| | | | |
|---|---|---|---|
| 6,690,392 B1 * | 2/2004 | Wugoski | ............. 715/744 |
| 6,784,805 B2 | 8/2004 | Harris et al. | |
| 7,129,855 B2 | 10/2006 | Krzyzanowski et al. | |
| 7,421,654 B2 * | 9/2008 | Wugoski, Theodore David | 715/704 |
| 2003/0120831 A1 | 6/2003 | Dubil et al. | |
| 2003/0234737 A1 * | 12/2003 | Nelson et al. | ............. 341/176 |
| 2004/0163073 A1 | 8/2004 | Krzyzanowski et al. | |
| 2005/0128048 A1 | 6/2005 | Krzyzanowski et al. | |
| 2005/0154999 A1 * | 7/2005 | Wugoski | ............. 715/827 |
| 2005/0159823 A1 | 7/2005 | Hayes et al. | |
| 2006/0235701 A1 | 10/2006 | Cane et al. | |

OTHER PUBLICATIONS

International Search Report for PCT/US08/07487, Sep. 17, 2008, 10 pp.

* cited by examiner

*Primary Examiner*—Christopher B Shin
(74) *Attorney, Agent, or Firm*—Sterne Kessler Goldstein & Fox, P.L.L.C.

(57) ABSTRACT

The present invention provides apparatus, systems and methods for activity-based control of multiple consumer electronic devices independent of a state of the consumer electronic devices. In an embodiment a remote control apparatus for controlling consumer electronic devices includes a user interface, a consumer electronic device interface, a transition-based controller and control logic. The transition-based controller generates transition commands to control multiple consumer electronic devices independent of keeping track of state information. A transition command includes a pre-defined sequence of consumer electronic device commands that can be transmitted to transition the consumer electronic devices from one user experience to another. A method for activity-based control of multiple consumer electronic devices independent of a state of the consumer electronic devices is also provided.

4 Claims, 6 Drawing Sheets

FIG. 6

SYSTEMS AND METHODS FOR ACTIVITY-BASED CONTROL OF CONSUMER ELECTRONICS

BACKGROUND OF THE INVENTION

1. Field of the Invention

The present invention relates to consumer electronics, and more particularly, to activity-based control of consumer electronics.

2. Background of Invention

The majority of consumer electronic ("CE") devices are remotely controllable through handheld remote control units that transmit commands via signals intelligible to the CE device. Remote control units can control a plethora of CE devices including, but not limited to televisions, amplifiers, stereos, receivers, VCRs, DVD players (including, but not limited to Blu-Ray and HD-DVD players), CD players, personal video recorders, tape players, cable or satellite set-top boxes, lighting systems, window shade systems and climate control systems. Example commands for controlling such devices include, but are not limited to, power on/off, channel select, channel up/down, and volume up/down.

A conventional remote control typically comprises a housing structure, a keypad within the housing structure for entering commands by the user, electronic circuitry within the housing structure connected to the keypad, and a transmitter electrically coupled to the electronic circuitry for transmitting a control signal, which is typically an infra-red ("IR") or radio frequency ("RF") signal to an electronic device to be operated. More advanced remote controls further support a user interface consisting of an LCD screen, for example, that allows more sophisticated use of the remote control. Other types of remote control units can include, but are not limited to, personal data assistants ("PDA") or smartphones.

Increasingly, a single remote control, commonly referred to as a "universal remote control," is used to control multiple electronic devices. Most universal remote controls have selector buttons or icons that are associated with the specific electronic devices to be controlled, such a VCR, DVD, Cable, etc.). Additionally, some remote control devices support "Activity-based" or "experienced based control."

"Activity-based" or "experience-based" control refers to giving the user of a remote control device the ability to select an activity, or "user experience," such as "watch DVD," instead of controlling the individual devices directly. The device will send commands that power on the needed devices, set their inputs, and set their tuners in a way that instantiates that experience (e.g., turn TV on, wait, set it to the AV2 input, turn the receiver on, set the receiver to the DVD input, turn the DVD on, etc.).

The challenge in performing activity-based control is that the device control commands that have to be sent are often dependent on the current status of the device. This status is a function of the commands that were previously sent to the device. For example, a power-toggle command will turn a device on if it is currently off, and turn the device off if it is on. An input-cycle command will change a device's input selection to the next input in its sequence of inputs.

The traditional approach to performing this type of control, adopted by most integrators (i.e., organizations that program home control systems, such as those manufactured by Crestron and AMX), has been to track user commands and model the state in the software of the control system according to those commands. For example, the control software will start with all devices in a known state. When it sends a power-toggle command to a TV, it will set its status of that TV as "on." When the TV needs to be turned off, the control software will check if its status is "off." If the state is not "off", the software will send a power-toggle command and set the state to "on."

The traditional approach to activity-based control depends on tracking user commands input into the remote control device to calculate device state. In other words, this approach essentially assumes what the states of the devices should be according to user operation, rather than what they actually are. As a result, this approach is only as good as the accuracy of its device-state assumptions. On occasion, these assumptions are incorrect and the system "gets out of whack" and must be resynchronized with the remote control device by the user. This may happen, for example, if an IR control signal was blocked from being received by the device.

An alternative technique for activity-based control is to use discrete commands that are not dependent on the current device state. Examples of these are "on," "off," and explicit input selectors. Unfortunately, these commands are not always available for devices. Another alternative technique is to use sensors to determine the true on/off state of a device. These include status LED sensors, RF emission sensors (for TV), and current change sensors. These can be used only for changes that can be measured and become problematic or impossible to use for detecting the current device input state.

Accordingly, what is needed is a new approach to achieving activity-based control that provides an alternative to existing approaches dependent on device state.

SUMMARY OF THE INVENTION

The present invention provides apparatus, systems and methods for activity-based control of multiple CE devices independent of keeping track of the state of the individual CE devices. In an embodiment an apparatus for controlling CE devices includes a user interface, a CE device interface, a transition-based controller and control logic. The user interface exchanges information between a user and the apparatus. The user interface can include a keypad, a voice recognition system or a graphical user interface display. The CE device interface exchanges information between a CE device and the apparatus. The transition-based controller generates transition commands to transition multiple CE devices from one activity to another, independent of keeping track of the state information of the CE devices. A transition command includes a pre-defined sequence of CE device commands that can be transmitted to transition the CE devices from one user experience to another. The control logic is coupled to the user interface, CE device interface and transition-based controller and provides overall control of the apparatus.

In an embodiment, a transition-based controller is provided that includes a transition initialization module that identifies CE device configurations for all useful user experiences and defines the transition commands between user experiences, which is used for initial configuration or for modifying a configuration. The transition-based controller also includes a current node module that stores the current node in a finite state machine. Lastly, the transition-based controller includes a transition command module that includes transition commands generated by the transition initialization module. The present invention does not store or model the predicted current state of devices. Rather, the present invention stores only an identifier for a current node in a state transition graph.

A method for activity-based control of multiple CE devices independent of the state of the CE devices is also provided. In general, control is dependent on the actual state of CE devices. However, within the present invention, control is independent of modeling or otherwise keeping track of the state of CE devices. Advantages of the present invention include, but are not limited to, providing an alternative approach to existing methods and systems that are dependent upon on device state, as well as efficiently using computation resources without the need for conditional logic at the time of operation.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention is directed to a system and method of activity-based control that does not depend on knowing or calculating the state of devices. Rather, according to the present invention, the system identifies all useful device configurations (typically at set up) and then defines the commands that need to be sent to achieve the transition from one configuration to another. This environment can be viewed as a graph, or finite state machine, where a node (vertex) represents a particular configuration (inputs, power, channel) for a set of devices and the transition (edge) to another node represents the set of commands that need to be sent to achieve the state transition between activity configurations (e.g., a transition from watching cable TV to watching a DVD).

Figure 1:
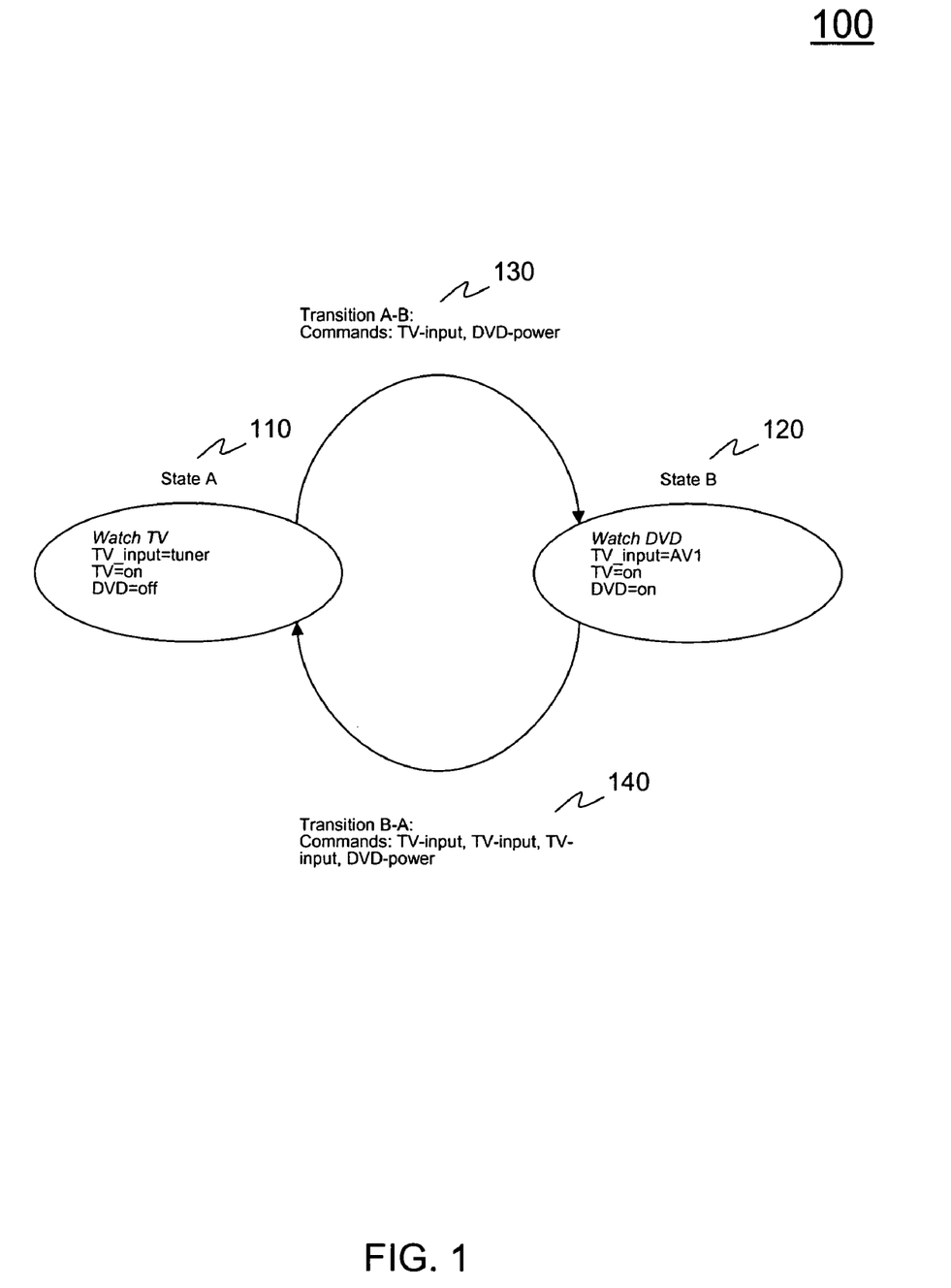
FIG. 1 provides a sample state diagram for provides a state diagram for a two-node system for controlling a TV and a DVD player.

By way of a simple example, FIG. 1 provides a state diagram for a two-node system for controlling a TV and a DVD player. For purposes of this example, these devices have the following specific control features that are known to the system either by reference to a database or by input from the user: (1) toggled power commands are used to switch the DVD and TV on and off; and (2) the TV has cyclic input selection: sending an input command switches the TV's input to the next one in the cycle. For this example, the TV has four inputs in the cycle: {tuner, DVD, other, other}.

The two nodes, node 110 and node 120, shown in FIG. 1 correspond to two possible activities or user experiences available to a user of this system: Watch TV (State A) and Watch DVD (State B). Specifically, node 110 models the state where the TV is set to the tuner for the Watch TV activity. Node 120 models the state corresponding to Watch DVD, where the TV is set to the DVD input and the DVD is on.

To switch from node 110 (Watch TV) to node 120 (Watch DVD), one would follow transition 130. This involves sending the following commands: an input command to the TV and a power command to the DVD. The input command to the TV switches the input of the TV to the next input in the cycle (DVD) and the power command to the DVD turns the DVD on. Collectively, these commands are referred to as a transition command.

To switch from node 120 (Watch DVD) to node 110 (Watch TV), one would follow transition 140. In this case, the TV gets sent three successive input commands to cycle it back to the tuner input and the DVD is sent a power command to turn it off.

The key point of this approach is that at no time is the remote control unit aware of whether a device is actually on or off, what input is selected, or what channel is selected. The only knowledge the remote control unit has is of its current "state" (current node), possible transitions from the node, and the commands to send upon taking those transitions. State, in the context of this document, refers to the node on the graph (a state in a finite state machine), not the representation or modeling of a device's setting.

Figure 2:
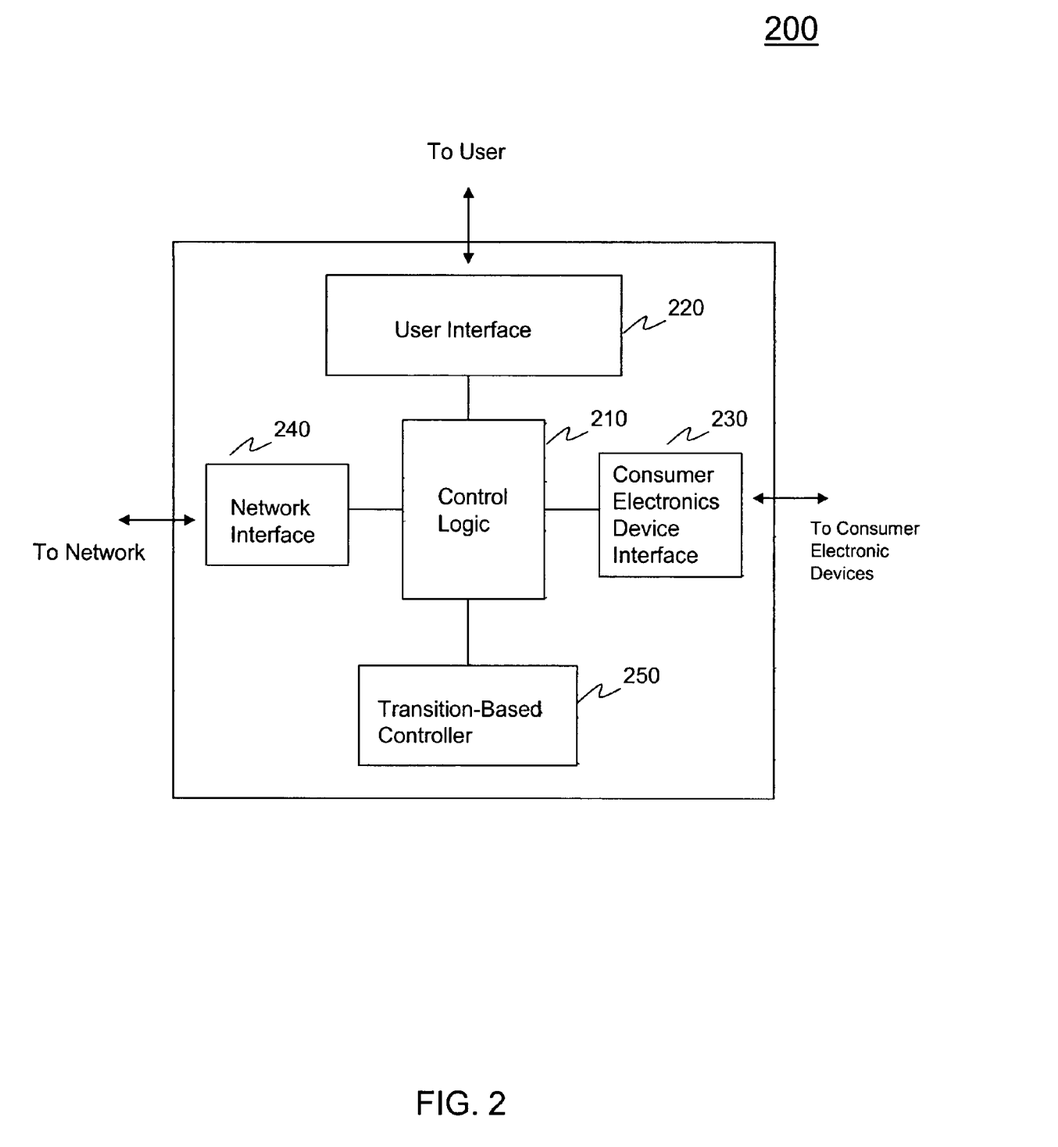
FIG. 2 provides a diagram of a remote control that includes a transition-based controller, according to an embodiment of the invention.

FIG. 2 provides a diagram of remote control 200 that includes transition-based controller 250 for activity-based control of multiple CE devices independent of any modeled state of the CE devices, according to an embodiment of the invention.

As shown in FIG. 2, remote control unit 200 includes user interface 220 for receiving user input and, optionally, providing information to a user, an optional network interface 240 for providing access to a network, and a CE device interface 230 for transmitting information to, and optionally receiving information from, a CE device. In an embodiment, user interface 220 comprises a graphical user interface ("GUI") that receives user input via a touch-sensitive display. In alternate embodiments, user interface 220 can include a keypad, a voice recognition system or other types of data entry interfaces. Network interface 240 comprises a plug-in or built-in WiFi network card that includes an IEEE 802.11b-compliant transceiver, and CE device interface 230 comprises a one-way IR transmitter or, alternately, a two-way IR transceiver. In an alternate embodiment, CE device interface 230 comprises a WiFi transmitter or transceiver adapted for communication in accordance with an IEEE 802.11 protocol. In addition to the 802.11 family of protocols, other radio frequency systems can be used, such as, for example, but not limited to, Bluetooth, ZigBee, ZenSys or other custom protocols.

Remote control unit 200 also includes transition-based controller 250. Transition-based controller 250 generates transition commands to control multiple CE devices without having to know or model the state of the CE devices. A transition command includes a pre-defined sequence of CE device commands that can be transmitted to transition the CE devices from one user experience to another. A user experience refers to how a set of electronic devices would be configured to provide a particular "experience." For example, a user experience may be to "Listen to Stereo with Romantic Mood," which would equate to having the stereo turned on low, the lights dimmed and the window shades drawn." Transition-based controller 250 is explained further with respect to FIG. 3.

As shown in FIG. 2, remote control unit 200 further includes control logic 210, which is communicatively coupled to user interface 220, network interface 240, and CE device interface 230. Control logic 210 is adapted to execute features, including but not limited to processing user input received from user interface 220, exchanging information with transition-based controller 250 and transmitting transition commands to a CE devices via CE device interface 230. As will be appreciated by persons skilled in the relevant art(s) based on the teachings provided herein, control logic 210 may be readily implemented in hardware, software, or as combination of hardware and software.

Figure 3:
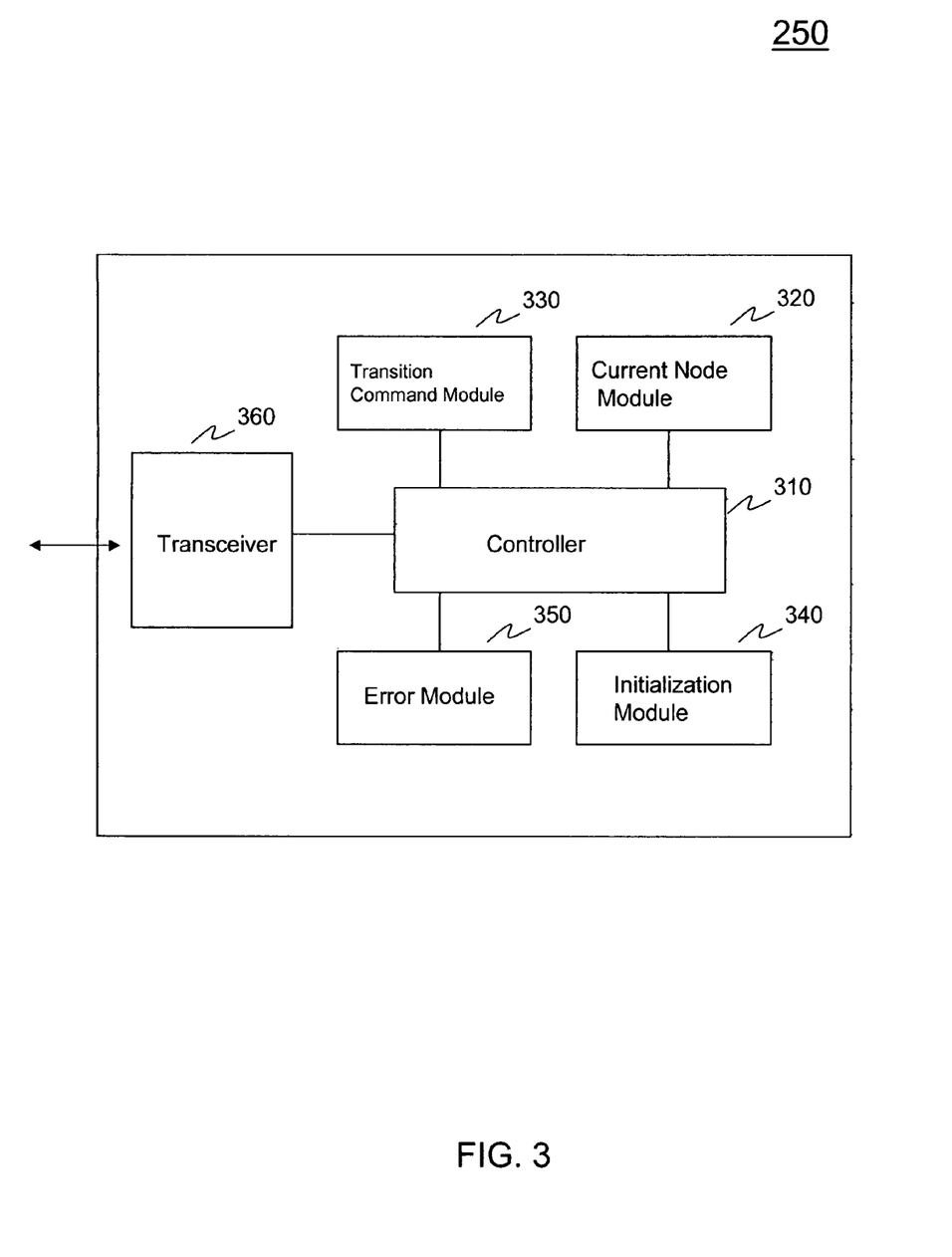
FIG. 3 provides a diagram of a transition-based controller, according to an embodiment of the invention.

FIG. 3 provides a diagram of transition-based controller 250, according to an embodiment of the invention. Transition-based controller 250 includes controller 310, current node module 320, transition command module 330, transition initialization module 340, error module 350 and transceiver 360.

Current node module 320 stores the current state (as represented by a node in a finite state machine) of each of the CE devices. In an embodiment, current node module 320 stores a single identifier that identifies a node in a finite state machine. Transition command module 330 includes transition commands generated by the transition initialization module for transitioning from one node to another node in the finite state machine. Transition initialization module 340 identifies CE device configurations for all useful user experiences and defines the transition commands between user experiences. In an embodiment, transition initialization module 340 can exist outside transition-based controller 250. For example, transition initialization module 340 can reside on a user's computer or on a server and be accessible via a web interface that provides a download of the state machine. Error module 350 allows a user to re-sync the settings of CE devices with the current state for the node stored in current node module 320, if they get out of sync.

Note that current node module 320 does not store device settings or state information since the system is not designed to use such information. In embodiments, current node module 320 may store annotation information (e.g., "DVD should be on."). Alternatively, current node module 320 may store no annotation data. In either case, the user may be provided with the opportunity to power devices and set inputs without affecting any state transitions in the event that corrections must be made to ensure that the real state of the devices matches up with the needs of the current experience. This will be required if the system is susceptible to transmission errors or losses (e.g., an IR signal is blocked). The concept is that a user would naturally set the devices to a state that reflects the current activity that he wanted.

Transceiver 360 exchanges information between transition-based controller 250 and the control logic 210. Controller 310 is coupled to current node module 320, transition command module 330, initialization module 340, error module 350 and transceiver 360 and controls their operation.

As will be appreciated by persons skilled in the relevant art(s) based on the teachings provided herein, transition-based controller 250 may be readily implemented in hardware, software, or as combination of hardware and software.

Figure 4:
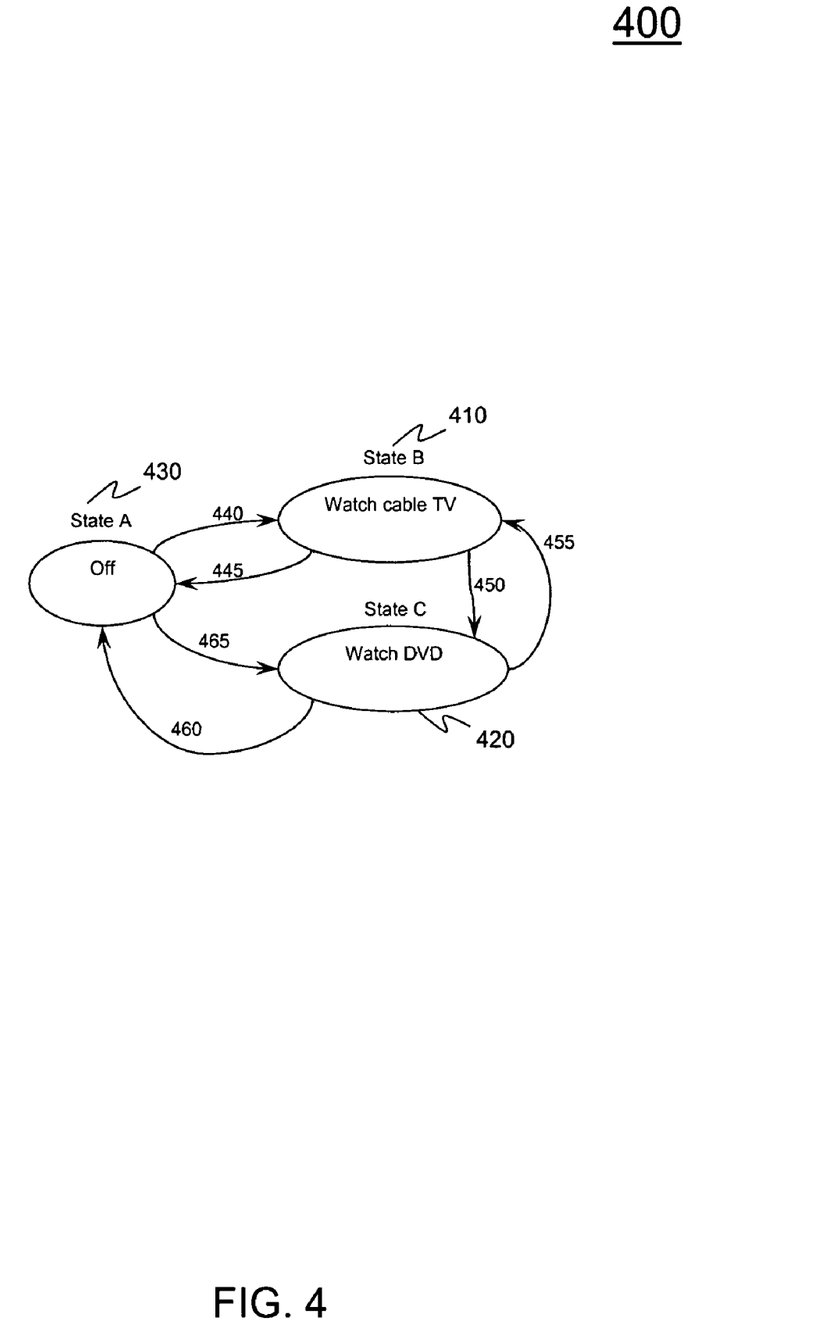
FIG. 4 provides an example of defining a finite state machine involving multiple user experiences, according to an embodiment of the invention.

To help illustrate the operation of remote control unit 200, FIG. 4 provides a more complicated and realistic example of defining a finite state machine, state machine 400, involving multiple user experiences. This example presents a similar two-device configuration to the one shown in FIG. 1, involving a TV and a DVD. Unlike FIG. 1, this example adds a third node, "off," (node 430) which represents all devices being turned off. Specifically, state machine 400 includes three nodes, node 410, node 420 and node 430. Also, in this system, the user can watch cable (in addition to DVD) on his TV, and the input cycle on the TV is: {tuner, cable, DVD, other}. FIG. 4 illustrates the six state transitions for this configuration, transitions 440, 445, 450, 455, 460, and 465.

Figure 5:
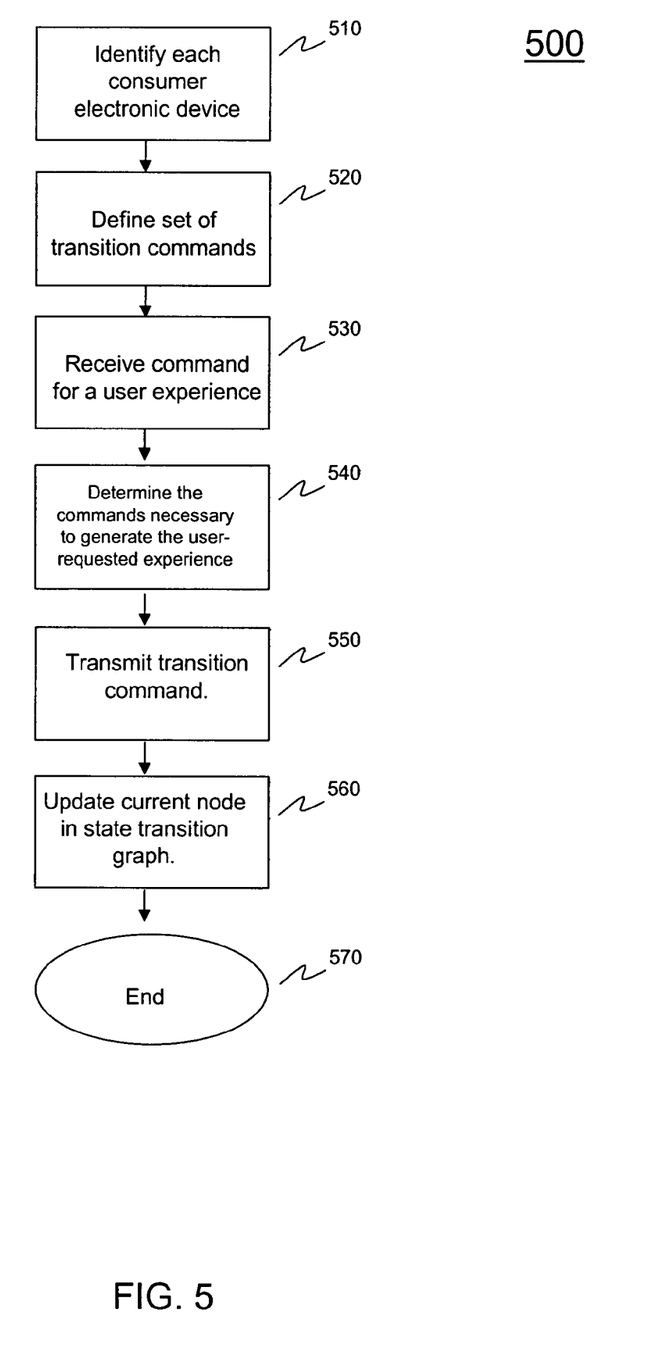
FIG. 5 provides a flowchart of a method for activity-based control of multiple CE devices independent of modeling the state of the CE devices, according to an embodiment of the invention.

FIG. 5 provides a flowchart of method 500 for activity-based control of multiple CE devices independent of the state of the CE devices, according to an embodiment of the invention. FIG. 5 will be described in the context of the example state machine shown in FIG. 4 and with reference to remote control unit 200 for the purpose of illustration and not to limit the invention to these particular scenarios.

Method 500 begins in step 510. In step 510 each of the CE devices within a user area are identified. Identification can occur either explicitly by the user or by automatic discovery of the devices (e.g., via a network query or broadcast, such as with Universal Plug & Play—UPnP—devices). In an embodiment, initialization module 340 implements step 510. To define transitions between the nodes, initialization module 340 has to first identify all the CE devices within the user's environment (e.g., Sharp Aquos TV and Panasonic DVD-A120 DVD player), the desired user experiences (including "all off" and "watch DVD"), and the control behaviors (i.e. metadata) of each device (e.g., what commands does it take to change the input of a TV from tuner to DVD?). In an embodiment, the control information may be stored in a database (not illustrated) that describes device control, including, for example, IR codes.

Remote control unit 200 accomplishes this through input from the user via a set-up process (see, e.g., the detailed description set forth in commonly owned and co-pending U.S. patent application Ser. No. 11/042,178, entitled "Method, System, and Computer Program Product for Set-up of Multi-Device Control," which is incorporated herein in its entirety) and through access to a database of metadata and other device-specific control data (see, e.g., commonly owned and co-pending U.S. patent application Ser. No. 10/783,017, entitled "Device Control System, Method, and Apparatus," which is incorporated herein in its entirety). For purposes of the present example, and not by limitation, the system implements the following rule from information it obtained from the user during the set-up process: On a transition between any two states, A and B, if a device is used in A and is not needed in B, then it is shut off.

A further assumption is that remote control unit 200 also obtained the following metadata about the specific devices from a database: If a device starts up at the same point in the input cycle when it was shut off, the inputs are cycled to some predefined starting state before the device is shut off.

In step 520 a state transition graph that includes a set of transition commands that need to be sent to achieve a transition from one configuration of the CE devices to another configuration is defined. When a set of transition commands have been defined, these are stored in transition command module 330.

The process of determining a set of transition commands includes first setting up the finite state machine (i.e., defining transitions from one user experience to another) and then defining the necessary commands to implement the transition for all the effected CE devices.

For the process of setting up the finite state machine (defining transitions), transition-based controller 250 needs to define the device settings (e.g., input, channel, and power) for each node so that the correct transition commands can be defined. Once the definition stage is over, this configuration information can be discarded and only the generated transitions retained. Neither the nodes (states) nor the transitions between the states have any inherent record of whether a device is in any particular state (e.g., power, input, or channel settings.)

The following table illustrates all possible states in this example illustrated in FIG. 4:

| State | TV power | TV input | DVD power |
|---|---|---|---|
| A (off)-State 430 | Off | Tuner (0) | Off |
| B (watch cable)-State 410 | On | Cable (1) | Off |
| C (watch DVD)-State 420 | On | DVD (2) | On |

In general, there will be n(n−1) transitions for a system with n states. As shown in the following state transition table, there are six possible transitions among these states in this example:

| Transition | TV commands | DVD commands |
|---|---|---|
| A-B (off → watch cable)-Transition 440 | power, input | |
| A-C (off → watch DVD)-Transition 465 | power, input, input | power |
| B-C (watch cable → watch DVD)-Transition 450 | Input | power |
| C-B (watch DVD → watch cable)-Transition 455 | input, input, input | power |
| C-A (watch DVD → off)-Transition 460 | input, input, power | power |
| B-A (watch cable → off)-Transition 445 | input, input, input, power | |

The approach for filling in a state transition table can be encapsulated in an algorithm such as:

```
for each state s in all states
    for each state t in all states
        if s != t then
            for each device d in (s ∪ t)
                if (s.d.power != t.d.power) then
                    if d.power is cyclic then
                        add d.power command to transition[s-t]
                        add d.power command to transition[t-s]
                    else if (s.d.power == "off") then
                        add d.on command to transition[s-t]
                        add d.off command to transition[t-s]
                if (s.d.input != t.d.input) then
                    if s.d.input is cyclic then
                        add d.input command(s) to transition[s-t]
                        add d.input command(s) to transition[t-s]
                    else
                        add appropriate input selection to transition[s-t]
                        add appropriate input selection to transition[t-s]
    end
``` where an expression such as s.d.power represents the desired power setting for device d in state s and the d.power command represents the power toggle command for device d. The input selection commands depend on the specific device that is being controlled. They may consist of simply a sequence of input commands or may, for example, involve sending commands to enter an on-screen menu, select an input, and exit the menu.

The procedure described can be generalized to commands beyond input selection and power, and include controls such as channel selection, surround-sound mode, and screen aspect ratio.

The key point is that each state for an activity represents a function of the set of activities that were visited prior to that activity. Transitions to other activities from a given state take place only to states that include that previous activity. The commands generated for the transition will be based on required operations, such as the need to turn a device "on" or whether inputs need to be selected on whether the device is needed in the new activity and whether it was already turned on (or tuned) in prior activities, even if the current activity did not use it.

Multi-state activity graphs are generated by enumerating all combinations of other activities for each activity state. For example, for the aforementioned example, the four "watch cable" states are generated by iterating through all combinations (not permutations) of the other activities: "watch DVD" and "watch VCR."

Each transition to a state comes from states that have the same combination of activities, both including and not including the current state. Each transition from a state is to states that have the same combination of activities.

Given a set of n activities, $A_1, A_2, A_3, \ldots, A_n$ the complete set of states and transitions can be created by:

```
for i = 1 to n (for each activity)
    for S = each combination of activities that include A_i (# states = 2n-1)
        (this is state Ai:S for activity Ai)
        if A_i:S = { A_i }
            create transition from "off" state to A_i:S
        for j = 1 to n
            (create transitions to each other activity from each state in this activity)
            if j != i (no need to have a transition to the same activity)
                create transition from A_i:S state to A_j:{S, A_i}
                create transition from A_i:S state to "off"
```

An optimization beyond this step is to remove redundant states. Two states for the same activity can be collapsed into one if the status of all devices represented by that state is identical for purposes of control. For example, using our cable TV, DVD, and VCR example, one would create four states for the "watch DVD" activity:

(1) Initial state from "off" state. TV, DVD, and VCR were all off.

(2) State where only "watch cable TV" was active in the past.

(3) State where only "watch VCR" was active in the past.

(4) State where both "watch cable TV" and "watch VCR" were active in the past.

Using the knowledge of which devices have to be on for each activity (obtained during configuration or hard-coded into the system), each of these enumerated activity states corresponds to the following device settings:

(1) TV=on, DVD=on, VCR=off.

(2) TV=on, DVD=on, VCR=off.

(3) TV=on, DVD=on, VCR=on.

(4) TV=on, DVD=on, VCR=on.

Because the devices controlled in the "watch cable TV" activity happened to be a subset of the devices in the "watch DVD" and "watch VCR" activities, states (1) and (2) can be collapsed into a single state and states (3) and (4) can be collapsed into a single state.

Some devices, such as TVs, amplifiers, and receivers, allow their inputs to be switched by looping through a cycle (having a user repeatedly press an "input" button, for example). The transition-based approach in its pure form would require that all inputs be cycled back to a well-known "initial" input before a device is shut off. An alternative approach to dealing with cycles is to keep track of the cycle position and cycle period for each device that has cyclic inputs.

After startup, the first request for cycling the input N times is translated to a request to cycle the input (N-C)mod P cycles, where C is the global cycle count for that device. Thereafter, the new cycle position, C, is set to N mod P, wherein P equals the total cycles before cycling back. For example, upon cycling through "tuner," "DVD," "VCR," "AV1," and "AV2" on a TV before getting back to "tuner," the value is 5. N equals the distance from the start position. For example, "tuner" is 0 and "av1" is 3. C equals the current position. For example, if the device is currently on VCR, then C is equal to 2. To get to AV1 from the current position (2), the system needs to advance N-C or 3−2=1 cycles. The mod P component allows the system to wrap around. If the system needs to get to the tuner (position 0) from the VCR (position 2), then the system needs to advance (0-2)mod 5=3 cycles.

In normal operation (i.e., beyond initial setup, when devices are not yet being controlled), the system as a whole does not model the meaning of the cycles—it only knows how many input cycle commands must be sent to go from one activity to another.

Referring back to FIG. 5, once the initialization steps 510 and 520 are completed, remote control unit 200 is ready for use by a user. Note that steps 510 and 520 only need to be done once to initialize a remote control unit, provided that additional CE devices are not added or subtracted from the user's environment serviced by remote control unit 200.

In step 530, a user input for an experience is received. For example, transition-based controller 250 can receive an indication that a user would like to watch a DVD.

In step 540, a command or multiple commands necessary to bring the consumer electronic devices into a suitable state for the user-requested experience by following the transition in a finite state machine from the current state (node) to the state (node) representing the user-requested experience is determined. For example, controller 310 identifies the transition command needed by accessing a transition command table in transition command module 330 that shows what transition command would be needed to go from the current state to the desired state.

In step 550, the transition command is transmitted to the CE devices. For example, the transition command is transmitted by CE device interface 230 to the effected CE devices.

In step 560, the tracking of the current node in the state transition graph is updated based on the transition command that was sent. This update of the current node in the graph is then stored in current node module 320. In step 570, method 500 ends.

If a physical device's settings (e.g., power, input, channel, ...) get out of sync from the expected setting for that state, the system can provide a list of expected settings for each of the devices (e.g., "TV on, TV input=AV2; DVD on; VCR off") and allow the user to issue control commands to the device to align the device's settings with the expected settings. Note that these are merely annotations and are not actually used in controlling the device or modeling the state. To reiterate, noting that "TV input=AV2" is as useful to the algorithms as noting that "TV cabinet=black." In an embodiment, error module 350 would enter an error correction routine to align the state of the CE devices with the state represented by the node stored in current node module 320. Alternatively, the user can make adjustments (e.g., switch inputs, toggle the power, and/or switch channels) as needed to achieve the desired activity via direct commands to the devices without changing the current node in the state transition graph or finite state machine.

In the previous discussions, there was always a one-to-one correspondence between an activity and a state (i.e., node on a graph). This need not always be the case. Suppose, for example, that the user is watching the DVD player and he or she does not want to turn the DVD off when switching back to the "watch cable TV" activity. In such a case, there are two states for "watch cable TV": one where the DVD is on and one where it is off. The user remains oblivious to this since these are merely internal states within the graph.

Thus, for purposes of transitioning between activities, there may be situations where the remote control need not be concerned whether a device is turned off. For example, if remote control unit 200 wants a DVD to stay on whenever the user switches from "watch DVD" to another activity, another state to the finite state graph needs to be added representing "watch cable TV with DVD on." A transition from "watch DVD" to "watch cable TV" will take remote control unit 200 to the original "watch cable TV (with DVD off) state." The user is unaware of these transitions and is merely cognizant of being in a "watch cable TV" activity where it doesn't matter if the DVD is on or off. The user interface allows the user to specify whether the DVD should stay on or off.

Figure 6:
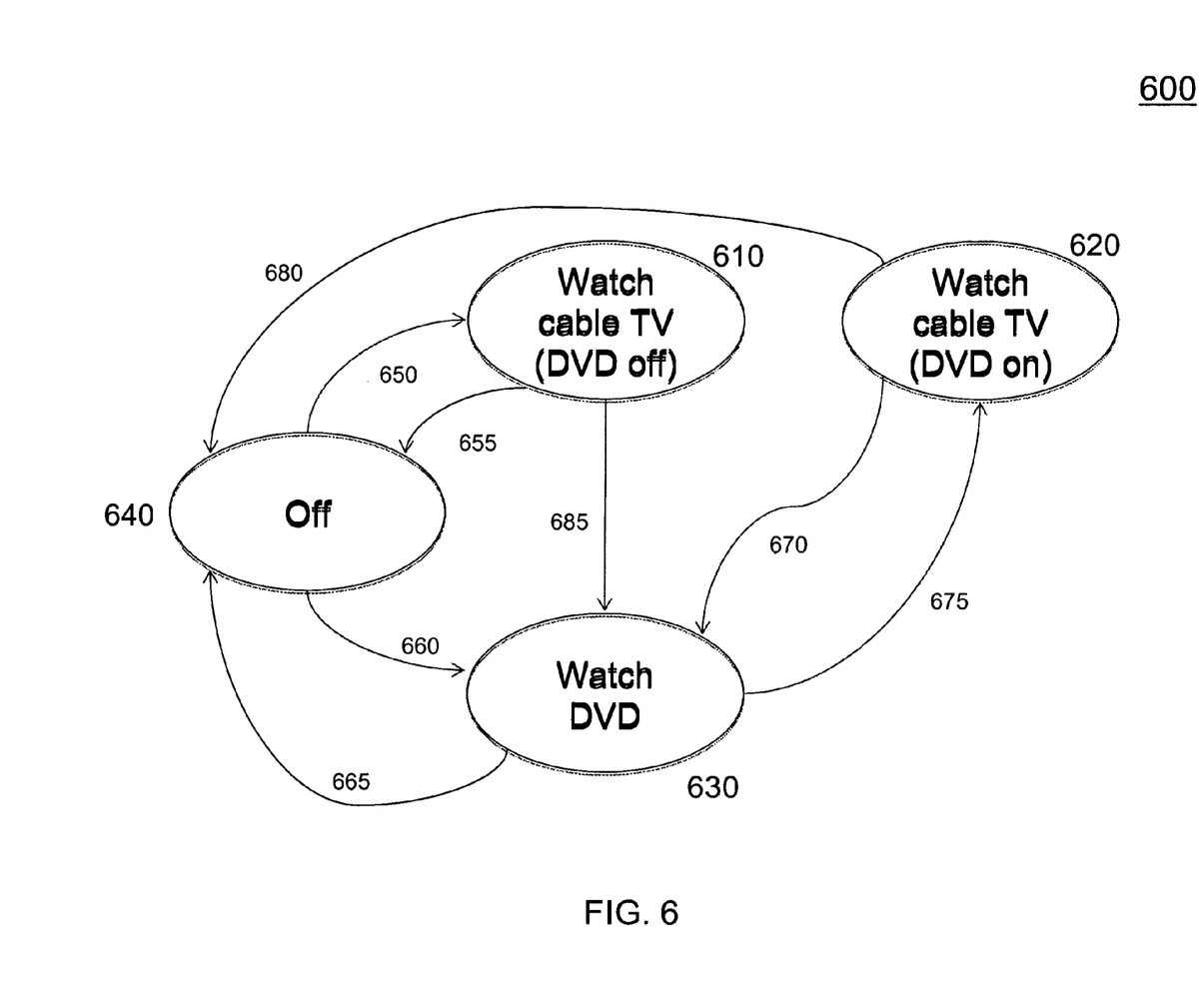
FIG. 6 provides an example of defining a finite state machine that illustrates the situation where whether one or more devices are on or off is irrelevant, according to an embodiment of the invention.

A finite state machine illustrating this situation is illustrated in FIG. 6. Specifically, FIG. 6 illustrates a finite state machine, state machine 600, involving four nodes, according to an embodiment of the invention. Like FIG. 4 above, this example presents a two-device configuration involving a TV and a DVD. The machine has a "watch DVD" node (node 630) and a "off" node (node 640). Unlike FIG. 4, however, this example splits the "watch cable TV" node into separate nodes: "watch cable TV (DVD off)" (node 610) and "watch cable TV (DVD on)" (node 620). FIG. 6 illustrates the eight state transitions for this configuration, transitions 650, 655, 660, 665, 670, 675, 680, and 685. Although this configuration requires an additional "watch cable TV" node, there is always a unique transition from an activity to the "watch cable TV" activity.

Finally, if we consider a configuration where we have a DVD and a VCR, things get even more complicated. The "watch cable TV" states will include:

(1) VCR and DVD off; achieved by a transition from the "off" state.

(2) DVD on, VCR off; achieved by a transition from the "watch DVD" state, never having entered the "watch VCR" state in the past.

(3) DVD off, VCR on; achieved by a transition from the "watch VCR" state, never having entered the "watch DVD" state in the past.

(4) DVD on, VCR on; achieved by a transition from the "watch VCR" state, having been in a "watch DVD" state at some prior time; or from the "watch DVD" state, having been in the "watch VCR" state at some prior time.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. An apparatus for controlling consumer electronic devices, comprising:
   a user interface that exchanges information between a user and the apparatus;
   a consumer electronic device interface that exchanges information between a consumer electronic device and the apparatus;
   a transition-based controller, wherein the transition-based controller generates transition commands to control multiple consumer electronic devices independent of keeping track of state information, wherein a transition command includes a pre-defined sequence of consumer electronic device commands that can be transmitted to transition the consumer electronic devices from one user experience to another, wherein the transition-based controller supports consumer electronic devices having cycled inputs without having to reset inputs of the consumer electronic devices having cycled inputs to a known fixed point; and
   control logic coupled to the user interface, consumer electronic device interface and transition-based controller.

2. A system for activity-based control of multiple consumer electronic devices independent of a state of the consumer electronic devices, comprising:
   a transition initialization module that identifies consumer electronic device configurations for all useful user experiences and defines transition commands between user experiences; wherein a transition command includes a pre-defined sequence of consumer electronic device commands that can be transmitted to transition the consumer electronic devices from one user experience to another, wherein the transition initialization command module supports consumer electronic devices having cycled inputs without having to reset inputs of the consumer electronic devices having cycled inputs to a known fixed point;
   a current node module that stores a node of a finite state machine representative of a current consumer electronic device configuration; and
   a transition command module that includes transition commands generated by the transition initialization module.

3. A method for activity-based control of multiple consumer electronic devices independent of a state of the consumer electronic devices, comprising:
   (a) receiving a user input for a user-requested experience;
   (b) determining a set of transition commands necessary to bring the consumer electronic devices into a suitable state for the user-requested experience by following a transition in a finite state machine from the current state to the state representing the user-requested experience; and
   (c) transmitting the set of transition commands to the consumer electronic devices, wherein the step of transmitting the set of transition commands to the consumer electronic devices includes supporting consumer electronic devices having cycled inputs without having to reset inputs of the consumer electronic devices having cycled inputs to a known fixed point.

4. The method of claim 3, further comprising
   (d) updating a current node in the finite state machine based on the transition that was taken from a prior node.

* * * * *